United States Patent
Zampieri et al.

(10) Patent No.: US 12,515,636 B2
(45) Date of Patent: Jan. 6, 2026

(54) PROCESS AND APPARATUS TO ADJUST THE STEERING ANGLE OF A MOTOR VEHICLE

(71) Applicants: FERRARI S.P.A., Modena (IT); POLITECNICO DI MILANO, Milan (IT)

(72) Inventors: Alberto Zampieri, Modena (IT); Francesca Mincigrucci, Modena (IT); Matteo Corno, Milan (IT); Sergio Matteo Savaresi, Milan (IT); Marta Ronchi, Milan (IT); Alberto Lucchini, Milan (IT)

(73) Assignees: FERRARI S.P.A. (IT); POLITECNICO DI MILANO (IT)

( * ) Notice: Subject to any disclaimer, the term of this patent is extended or adjusted under 35 U.S.C. 154(b) by 35 days.

(21) Appl. No.: 18/676,673

(22) Filed: May 29, 2024

(65) Prior Publication Data

US 2024/0400034 A1 Dec. 5, 2024

(30) Foreign Application Priority Data

May 30, 2023 (IT) .......................... 102023000010884

(51) Int. Cl.
*B60W 10/20* (2006.01)
(52) U.S. Cl.
CPC ......... *B60W 10/20* (2013.01); *B60W 2520/10* (2013.01); *B60W 2520/125* (2013.01); *B60W 2520/14* (2013.01)
(58) Field of Classification Search
CPC ............. B60W 10/20; B60W 2520/10; B60W 2520/125; B60W 2520/14; B62D 6/002; B62D 6/003

USPC ........................................................... 701/41
See application file for complete search history.

(56) References Cited

U.S. PATENT DOCUMENTS

| 2014/0343792 A1* | 11/2014 | Akiyama | B60W 10/184 |
| | | | 701/41 |
| 2021/0016825 A1* | 1/2021 | Miura | B62D 6/003 |

FOREIGN PATENT DOCUMENTS

EP 1097855 A2 5/2001

OTHER PUBLICATIONS

Search Report issued in Italian Patent Application No. 102023000010884.

* cited by examiner

*Primary Examiner* — Yi-Kai Wang
(74) *Attorney, Agent, or Firm* — The Belles Group, P.C.

(57) ABSTRACT

A process to adjust the steering angle of a motor vehicle is disclosed. The process includes providing a target relationship between a first variable and a second variable, defining a region of an algebraic space defined by the first variable and by a third variable, providing a mapping which associates each of pairs of values of the first and third variable in the region with a corresponding desirable value, such that the steering angle fulfils the target relationship, acquiring current values of the first and third variable, calculating the desirable value by means of the mapping based on the current values if defining one of the pairs of values in the region, determining a steering control signal as a function of the calculated desirable value, and controlling the actuator device with the steering control signal.

16 Claims, 7 Drawing Sheets

PROCESS AND APPARATUS TO ADJUST THE STEERING ANGLE OF A MOTOR VEHICLE

CROSS-REFERENCE TO RELATED APPLICATION

This patent application claims priority from Italian patent application no. 102023000010884 filed on May 30, 2023, the entire disclosure of which is incorporated herein by reference.

TECHNICAL FIELD

The invention relates to a process and to an apparatus to adjust the steering angle of a motor vehicle, in particular during the running thereof.

BACKGROUND

As is known, adjusting the steering angle in a motor vehicle during its driving involves a consequent dynamic response of the motor vehicle. The dynamic response is normally described by means of vehicle kinematic quantities which include, in particular, quantities describing a lateral dynamic of the motor vehicle such as the yaw rate and the lateral acceleration. The yaw rate and the lateral acceleration firstly depend on the driving speed of the motor vehicle, but not only. In fact, it is also known that the lateral dynamic of the motor vehicle is also directly influenced by the steering angle of the wheels. The steering angle, in turn, is determined by the manoeuvre of a steering control member, typically a steering wheel, by means of a steering assembly.

The steering assembly is coupled to the wheels and to the control member for transmitting the movement of the latter to the wheels. Usually, the steering assembly transmits the movement of the control member to the wheels with a given gain, which essentially depends on the characteristics of the steering assembly. Therefore, the dynamic response of the motor vehicle strongly depends on how the control member is maneuvered by the driver. This constitutes an unfavourable condition for the driver, who has to calibrate the manoeuvres of the control member in relation to the dynamic response of the vehicle, thereby acquiring experience and knowledge of the motor vehicle. Therefore, the driver needs experience in order to improve his/her driving technique, which involves an intrinsic driving difficulty.

In the light of the foregoing, the need is felt to increase the ease and the pleasure of driving the motor vehicle. Furthermore, the need is also felt to improve the stability of the motor vehicle. In particular, such needs are even more felt in sport or extreme driving conditions. In fact, in the latter case, according to the prior art, the experience and the alertness of the driver become extremely important. In other words, the difficulty in driving in extreme conditions results to be particularly high.

An object of the invention is to satisfy at least one of the needs set forth above.

DESCRIPTION OF THE INVENTION

In one aspect, the invention can be a process to adjust the steering angle of a motor vehicle, the motor vehicle comprising a pair of steerable wheels, a steering control member which can be operated so as to emit a first steering control signal, and an actuator device which can be controlled so as to steer the wheels based on a second steering control signal, thereby determining the steering angle as well as, consequently, a plurality of kinematic quantities of the motor vehicle based on a dynamic response of the motor vehicle depending on a driving speed of the motor vehicle, wherein the process comprises the steps of:

a. providing a first target functional relationship between a first variable corresponding to the driving speed and a second variable corresponding to a first ratio between a first quantity of said kinematic quantities and the steering angle;

b. defining a first region of an algebraic space defined by the first variable and by a third variable corresponding to the first steering control signal;

c. providing a first mapping, which associates each of first pairs of values of the first and third variable in the first region with a corresponding first desirable value for the second steering control signal, such that the steering angle that would consequently be determined by the actuator device fulfils the first target functional relationship;

d. acquiring first actual current values of the first and third variable;

e. calculating the first desirable value by means of the first mapping based on the first actual current values if defining one of the first pairs of values in the first region;

f. determining the second steering control signal as a function of the calculated first desirable value; and g. controlling the actuator device with the determined second steering control signal, thereby adjusting the steering angle.

In one aspect, the invention can be an apparatus to adjust the steering angle of a motor vehicle, the motor vehicle comprising a pair of steerable wheels, a steering control member which can be operated so as to emit a first steering control signal, and a actuator device which can be controlled so as to steer the wheels based on a second steering control signal, thereby determining the steering angle as well as, consequently, a plurality of kinematic quantities of the motor vehicle based on a dynamic response of the motor vehicle depending on a driving speed of the motor vehicle, wherein the apparatus comprises a control unit which is programmed to implement the process including steps a.-g. directly above.

In one aspect, the invention can be a motor vehicle comprising a pair of steerable wheels orientable at a steering angle, a steering control member which can be operated so as to emit a first steering control signal, an actuator device which can be controlled so as to change the steering angle of the wheels based on a second steering control signal, and a control unit programmed to provide a target functional relationship between a first variable corresponding to the driving speed of the motor vehicle and a second variable corresponding to a ratio between a kinematic quantity of the motor vehicle and the steering angle, define a region of an algebraic space defined by the first variable and by a third variable corresponding to the first steering control signal, provide a mapping which associates pairs of values of the first and third variables in the region with a corresponding desirable value for the second steering control signal such that the steering angle that would consequently be determined by the actuator device fulfils the target functional relationship, acquire actual current values of the first and third variables, calculate the desirable value by way of the mapping based on the actual current values of the first and third variables when defining one of the pairs of values in the region, determine the second steering control signal as a function of the calculated desirable value, and control the actuator device with the determined second steering control signal, thereby adjusting the steering angle of the wheels.

BRIEF DESCRIPTION OF THE DRAWINGS

The invention will now be described in the following with reference to the accompanying drawings, which illustrate a non-limiting embodiment thereof, wherein.

DETAILED DESCRIPTION OF THE INVENTION

Figure 1:
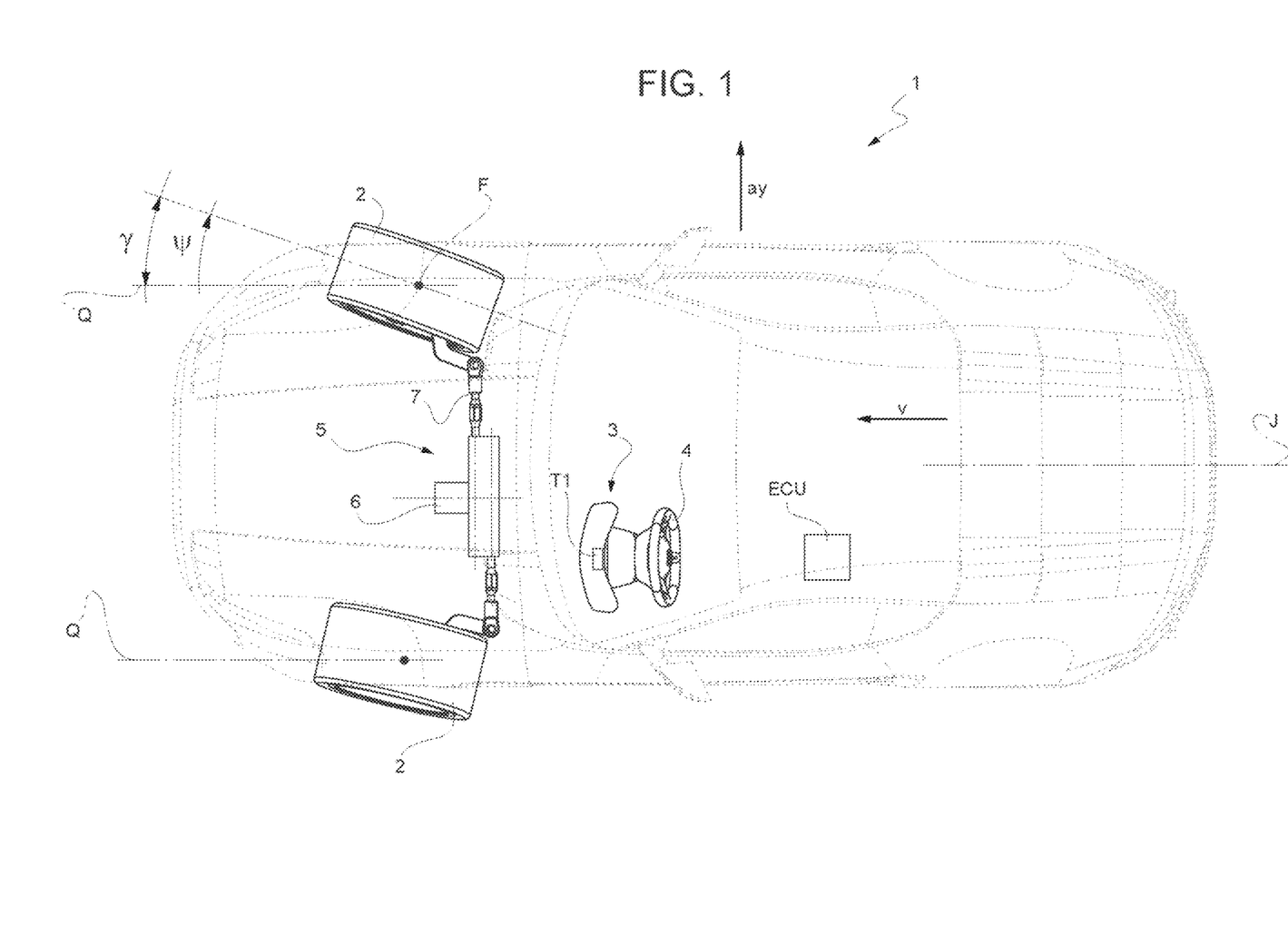
FIG. 1 is a schematic plan view of a motor vehicle comprising an apparatus according to an embodiment of the invention.

In FIG. 1, reference numeral 1 indicates, as a whole, a motor vehicle, in particular a front-wheel drive motor vehicle.

The motor vehicle 1 comprises a pair of steering wheels 2, in this case front steering wheels. Furthermore, the motor vehicle 1 comprises a steering control member 3, in particular a steering device.

In the illustrated embodiment, the wheels 2 are steered by means of a steer-by-wire system. In other words, a movement of the member 3 is not directly transmitted to the wheels 2 by means of a purely mechanical transmission assembly, but the movement is transduced in an electric signal which will be electronically processed for controlling the steering of the wheels.

Actually, the member 3 can be operated or maneuvered by a driver for emitting a steering control signal S1 depending on how it is maneuvered.

More specifically, the member 3 comprises a manoeuvrable body 4, in this case a steering wheel, and a transducer T1 configured to detect a quantity indicative of a movement of the body 4, in particular of a rotation angle of the steering wheel, and generate the signal S1 corresponding to the detected quantity.

Furthermore, the motor vehicle 1 comprises a control unit ECU coupled to the member 3 for receiving the signal S1. As it will be specifically explained in the following, the control unit ECU processes the signal S1 and emits another steering control signal S2 on such basis.

Furthermore, the motor vehicle 1 comprises an actuator device 5, which can be controlled by means of the signal S2 for steering the wheels 2.

In particular, the device 5 comprises a motor 6, more in particular an electric motor, which can be controlled by means of the signal S2. More specifically, the device 5 comprises a pinion and a rack not illustrated. The pinion is rotatable around its axis by means of the motor 6; the rack is coupled to the pinion so as to translate in response to the rotation of the pinion along an axis L transversal and more precisely orthogonal to the driving direction A of the motor vehicle 1. The rack is further coupled to a steering mechanism 7 of the device 5. The steering mechanism 7 is configured to transmit the translation of the rack to the wheels 2, which therefore consequently steer according to a steering angle $\gamma$ corresponding to the entity of the translation.

Each of the wheels 2 ideally has a centre F, through which an axis Q, horizontal and parallel to the direction J when the motor vehicle 1 is not steered, passes. The axis Q rotates due to the steering around the centre F around a further vertical axis, thereby defining the angle $\gamma$ as the angle formed by the axis Q rotated in relation to when parallel to the direction J. Therefore, the angle $\gamma$ is conventionally null when the axis Q is parallel to the direction J.

FIG. 1 illustrates a positive angle $\gamma$, corresponding to a clockwise rotation of the axis Q. In the following, the description will only refer to positive values of the angle $\gamma$, without any loss of generality. In fact, the teachings of the description will be applicable also to negative values in a similar manner. Clearly, the steering angle is here conventionally defined by the angle $\gamma$, although the steering angle could equivalently be defined by different angles, for example by the mean rotation angle of the respective axes Q of the wheels 2, without any loss of generality.

In this manner, the device 5 determines the steering angle based on the signal S2. The steering angle jointly with a driving speed of the vehicle, specifically a mean speed indicated in FIG. 1 by the symbol v, determine a plurality of kinematic quantities of the motor vehicle 1, among which in particular a yaw rate $\psi$ and a lateral acceleration $a_y$.

The kinematic quantities define the dynamic response of the motor vehicle 1 depending on the steering angle and on the speed v. More precisely, the dynamic response is a lateral dynamic response, also indicated by the term handling dynamic response.

The processing of the signal S1 and the emission of the signal S2 by means of the control unit ECU occurs based on a first target functional relationship between a first and a second variable which correspond to the speed v and to a first ratio between one of the kinematic quantities and the steering angle.

Specifically, the first ratio is between the yaw rate $\psi$ and the steering angle, more precisely the ratio of the yaw rate $\psi$ on the steering angle.

Figure 4:
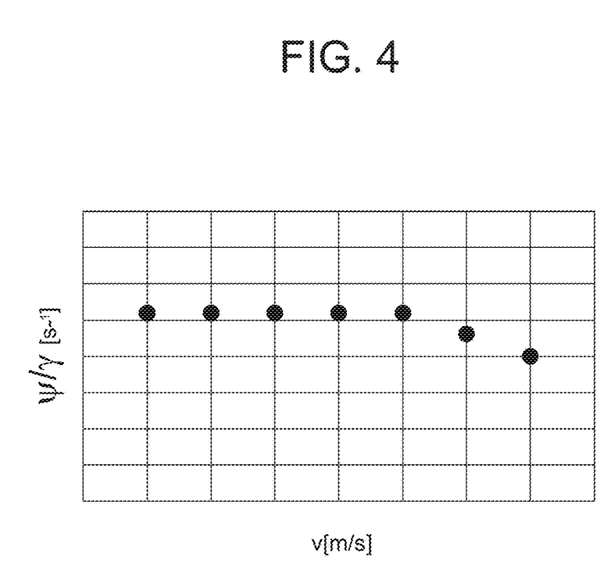

The first target functional relationship is for example illustrated in FIG. 4. The first target functional relationship represents a desired link between the variables, which could be obtained, for example, by suitably varying a gain between the signals S1 and S2.

In fact, at least ideally, by also practically, the control unit ECU can calculate desirable values for the signal S2 by applying a variable gain to the values of the signal S1, based on the values of the signal S1 and on the speed v, so that the steering angles determined by the device 5 correspondingly to the desirable values for the signal S2 fulfil the aforementioned desired link, namely the first target functional relationship.

For clarity, in general, the desirable values do not necessarily coincide with actual values which the signal S2 may actually assume, for example based on additional criteria or constraints in relation to the fulfilment of the first target relationship.

Figure 3:
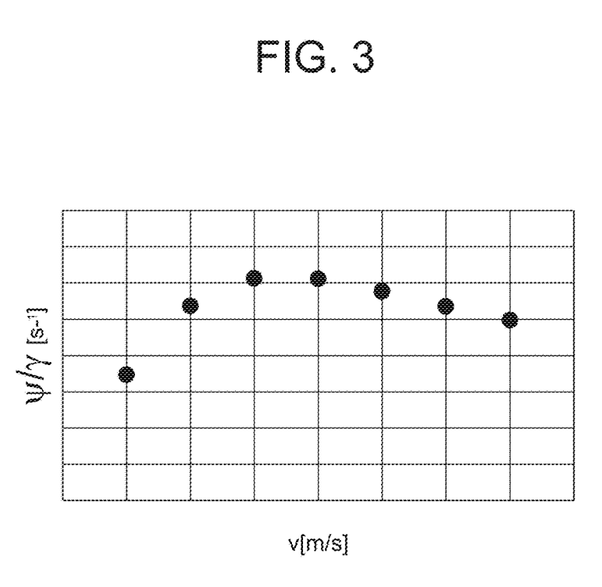
FIGS. 3 and 4 are function graphs which represent a real and target functional link, respectively, between kinematic quantities of the motor vehicle.

Differently, the first functional relationship which would be obtained between the first and the second variable by applying a constant gain to the values of the signal S1 would result to be, for example, as the one illustrated in FIG. 3. FIG. 3 thus illustrates a first real functional relationship, which is manipulated by means of a different processing of the signal S1.

Specifically, the first real functional relationship has, in relation to the first variable, a first increasing portion in a lower interval of the first variable and a second decreasing portion in an upper interval of the first variable; in particular, the first and the second intervals are adjacent.

On the other hand, the first target functional relationship has, in relation to the first variable, a first substantially constant portion. Then, in particular, the first target functional relationship has, in relation to the first variable, also a second decreasing portion. Here, the first and the second portions are defined in a lower and upper interval, respectively, of the first variable, in particular adjacent to each other.

The expression substantially constant preferably means that the relevant portion, namely the first ratio in relation to the first variable, has a maximum deviation in relation to the mean which is smaller, in module, than a predetermined threshold preferably stored by the control unit ECU. In this case, the relevant threshold is smaller than $0.05 \text{ s}^{-1}$.

For these reasons, the control unit ECU provides or stores a first mapping which preferably constitutes the aforementioned variable gain from the values of the signal S1 to the desirable values of the signal S2, such to allow obtaining the first target functional relationship by means of the device 5.

The first mapping can be defined between a first region of an algebraic space and the desirable values of the signal S2. The algebraic space is defined by the first variable and by a third variable corresponding to the signal S1.

The first mapping is applicable only to the first region, thus it associates pairs of values of the first and third variable in the first region with corresponding desirable values of the signal S2.

In view of the foregoing, the control unit ECU indirectly provides the first target functional relationship providing the first mapping, which is stored by the control unit ECU. In fact, the first target functional relationship is fulfilled, namely obtained as result of the use of the first mapping.

The control unit ECU defines the first region, in particular storing the boundaries thereof. For example, the first region includes values of the first and of the third variable for which the motor vehicle 1 has a substantially linear dynamic response. This can occur, in particular, when the lateral acceleration $a_y$ is smaller than a threshold parameter, for example equal to 0.7 G for dry road.

Actually, the linearity or non-linearity of the dynamic response can also depend on parameters on the outside of the motor vehicle 1, for example linked to the road conditions. In particular, the threshold parameter can decrease in the case of wet road. Likewise, for example, parameters of the wheels 2, in particular concerning the respective tyres of the wheels 2 (e.g. pressure and/or wear of the tyres), can influence the linearity of the dynamic response.

Preferably, the first region could be redefined or updated together with the first mapping based on parameters that influence the linearity, such that the first region is entirely associated with a linear dynamic response of the motor vehicle 1.

This would correspond to storing a plurality of first mappings in the control unit ECU in association with respective first regions. The control unit ECU would select in this case the first mapping and the first region which mostly correspond to a linear dynamic response of the motor vehicle 1. The selection occurs based on the parameters that influence the linearity, thus the control unit ECU acquires information concerning the same parameters, for example by means of known sensors or transducers suitably configured to detect the parameters, namely by means of known estimators or observers possibly based on known mathematical models.

Each of the first mappings can be experimentally determined based on tests of the motor vehicle 1 or by means of mathematical models, in particular of lateral dynamic, of the motor vehicle 1, such that the first target functional relationship results to be fulfilled. The mathematical models can be entirely theoretical or parametric, possibly of the "black box" or "grey box" type. In the case of parametric models, the latter can be identified from experimental data concerning the motor vehicle 1, for example by means of known model identification techniques.

Preferably, the processing of the signal S1 and the emission of the signal S2 also occur based on a second target functional relationship. The second target functional relationship is between the first variable and a fourth variable. The fourth variable corresponds to a second ratio between another one of the kinematic quantities and the steering angle.

Specifically, the second ratio is between the lateral acceleration $a_y$ and the steering angle, more precisely the ratio of the lateral acceleration $a_y$ on the steering angle.

Figure 6:
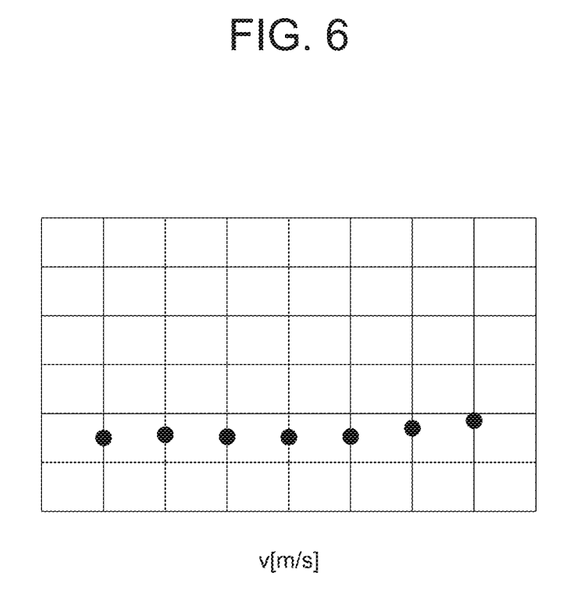

The second target functional relationship is for example illustrated in FIG. 6. In FIG. 6, the fourth variable is a dimensionless index of lateral acceleration which can be obtained, for example, dividing the second ratio by a reference acceleration. Therefore, in this case, it is evident that the fourth variable corresponds to the second ratio.

Figure 5:
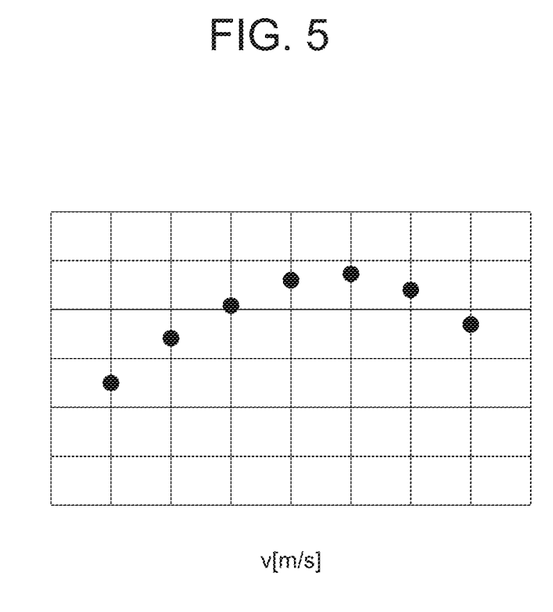
FIGS. 5 and 6 are further function graphs which represent a further real and target functional link, respectively, between further kinematic quantities of the motor vehicle.

The role of the second target functional relationship is similar to the one of the first target functional relationship. Namely, the control unit ECU calculates the desirable values for the signal S2 from the values of the signal S1 so as to fulfil the desired link expressed by the second target functional relationship. Vice versa, the second functional relationship which would be obtained between the first and the fourth variable by applying a constant gain to the values of the signal S1 would result to be, for example, as the one illustrated in FIG. 5. FIG. 5 thus illustrates a second real functional relationship, which is manipulated by means of a different processing of the signal S1.

Specifically, the second real functional relationship has, in relation to the first variable, a first increasing portion in a lower interval of the first variable and a second decreasing portion in an upper interval of the first variable; in particular, the first and the second intervals are adjacent.

On the other hand, the second target functional relationship is substantially constant in relation to the first variable. Namely, preferably, the second target functional relationship, namely the fourth variable (dimensionless index of acceleration, specifically) in relation to the first variable, has a maximum deviation in relation to the mean which is smaller, in module, than a predetermined threshold preferably stored by the control unit ECU. In this case, the relevant threshold is smaller than 0.07.

Therefore, the control unit ECU provides or stores a second mapping which preferably constitutes a further variable gain from the values of the signal S1 to the desirable values of the signal S2, such to allow obtaining the second target functional relationship by means of the device 5.

The role of the second mapping is similar to the one of the first mapping. The same considerations made for the first mapping are also true for the second mapping, unless otherwise specified. In particular, the same considerations are true with regard to the modes for determining the second mapping.

Unlike the first mapping, the second mapping can be defined between a second region of the same algebraic space, although distinct from the first region, and the desirable values of the signal S2.

The second mapping is applicable only on the second region, thus it associates pairs of values of the first and third variable in the second region with corresponding desirable values of the signal S2.

Also in this case, the control unit ECU indirectly provides the second target functional relationship providing the second mapping, which is stored by the control unit ECU. In fact, the second target functional relationship is fulfilled, namely obtained as result of the use of the second mapping.

The control unit ECU defines the second region, in particular storing the boundaries thereof. For example, the second region includes values of the first and of the third variable for which the motor vehicle 1 has a non-linear dynamic response. In a specular manner in relation to what described in the foregoing, this can occur when the lateral acceleration $a_y$ is greater than the threshold parameter.

All the considerations already described concerning the linearity and non-linearity of the dynamic response apply also in this case and thus will not be repeated for brevity. The same is also true with regard to the possibility of redefining the second region and the second mapping or storing a plurality of second mappings, as it occurs for the first region and the first mappings.

The first and the second regions, as well as the first and the second mappings, are complementary to and independent of each other. This means that one of the first and the second mapping could be absent in the control unit ECU, together with the first and the second region, respectively. Therefore, the control unit ECU does not necessarily provide both target functional relationships, but can provide only the first or the second target functional relationship, respectively, by means of the first or the second stored mapping. It goes without saying that the numeral adjectives, such as "first" and "second", do not have a limiting meaning but are merely conventional and therefore interchangeable.

Furthermore, the first and the second regions could be partially or totally contiguous to each other in the algebraic space, or even completely isolated from each other. The term contiguous is here understood as indicating that the first and the second regions partially or totally share their boundaries. Actually, more precisely, the boundaries belong only to one of the first and the second region, whereby they delimit the other one of the first and the second region.

Therefore, the control unit ECU applies the variable gain to the signal S1 if its value together with the speed v, namely if the values of the first and third variable fall within a region, for example the first or the second region, defined by the control unit ECU. Vice versa, the control unit could apply any gain, even fixed.

Actually, in the described embodiment, the first and the second regions completely form the algebraic space. Therefore, the control unit ECU will always apply a variable gain by means of the first mapping or the second mapping.

Figure 7:
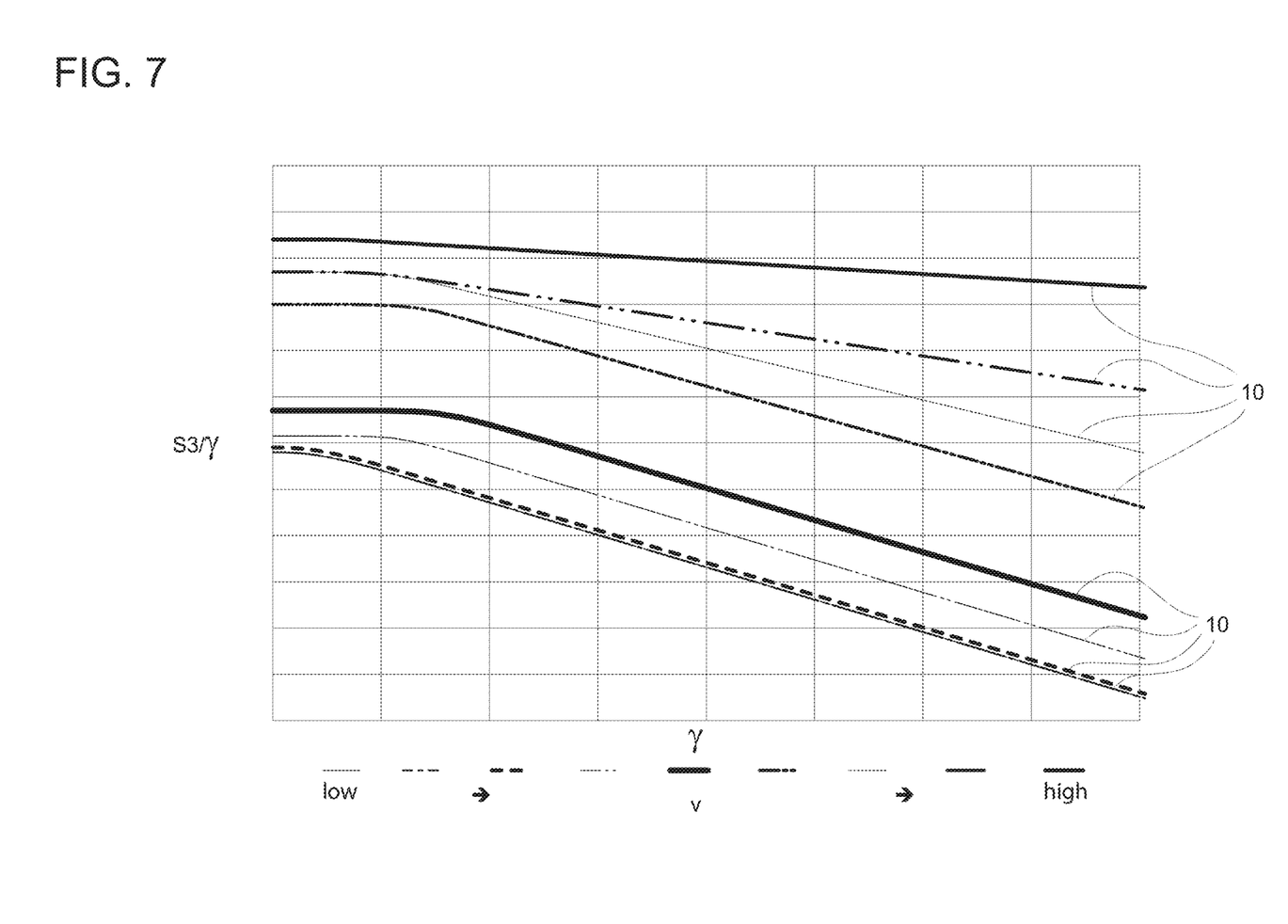
FIG. 7 is a graph which represents a mapping between quantities adapted to obtain target functional links of FIGS. 4 and 6.

FIG. 7 shows an exemplifying graph which represents the joining of two first functions being part of the first and of the second mapping, respectively.

In FIG. 7, the abscissa axis shows the values of the third variable, namely the values of the signal S1, for example corresponding to a clockwise rotation angle of the steering wheel (positive angles γ). More specifically, the ordinate axis shows the values of a gain to be applied to the signal S1 for obtaining an output value of an output signal S3. Clearly, the ordinate axis could have directly shown the output values of the output signal S3.

The output signal S3 could possibly define the desirable values of the signal S2, which do not necessarily coincide with the actual values of the same signal S2 calculated by the control unit ECU.

As it will be clearer from the following, the control unit ECU calculates the signal S2 as a function of the output signal S3, thereby producing the application of the first or of the second mapping based on the region where there are the values of the first and third variable.

FIG. 7 comprises a plurality of curves 10, each of which is associated with an interval of values of the first variable, namely of the speed v.

Therefore, a value of the first variable will correspond to one of the curves 10; furthermore, a value of the third variable (signal S1) on the same one of the curves 10 will correspond to an output value of the output signal S3.

Each of the curves 10 has a substantially constant portion and a decreasing portion in relation to the first variable. Specifically, the constant portion and the decreasing portion correspond to the first and to the second region, respectively.

In particular, the second region is inferiorly delimited by a control threshold for the third variable. The control threshold is a function of the first variable, in particular decreasing as the first variable increases. This is particularly evident in FIG. 7.

FIG. 7 is only one of the possible representations of said first functions, but each of the first functions, of the first and of the second mapping, respectively, could be represented by means of a table or mathematical expressions.

Conveniently, the control unit ECU calculates the signal S2 by means of the first or the second mapping also based on the dynamic response of the actuator device 5.

More specifically, the control unit ECU comprises or provides a model of the device 5 adapted to estimate the steering angle determined by the same device 5 based on the received signal S2. Specifically, the model applies a gain function to the signal S2.

In the case where the model of the device 5 is linear, the gain function corresponds to a transfer function from the signal S2 to the steering angle.

Each of the first and second mappings applies the inverse of the gain function to the output signal S3, namely to the output value, in order to correct the output signal S3 anticipating the dynamic response of the device 5.

Therefore, preferably, each of the first and of the second mappings comprises a same second function which associates the output value with the desirable value for the signal S2 based on the model of the device 5 applying a further gain function to the output value. The further gain function is defined by the inverse of the previous gain function, namely the inverse transfer function, in particular.

Furthermore, each of the first and of the second mappings comprises the aforementioned corresponding first function which associates each of the pairs of values of the first and third variable with a corresponding output value.

In this manner, the control unit ECU is capable of promptly controlling the device 5, also in the case where the dynamic response thereof results to be particularly slow, thereby diverging from an ideal design condition.

Figure 2:
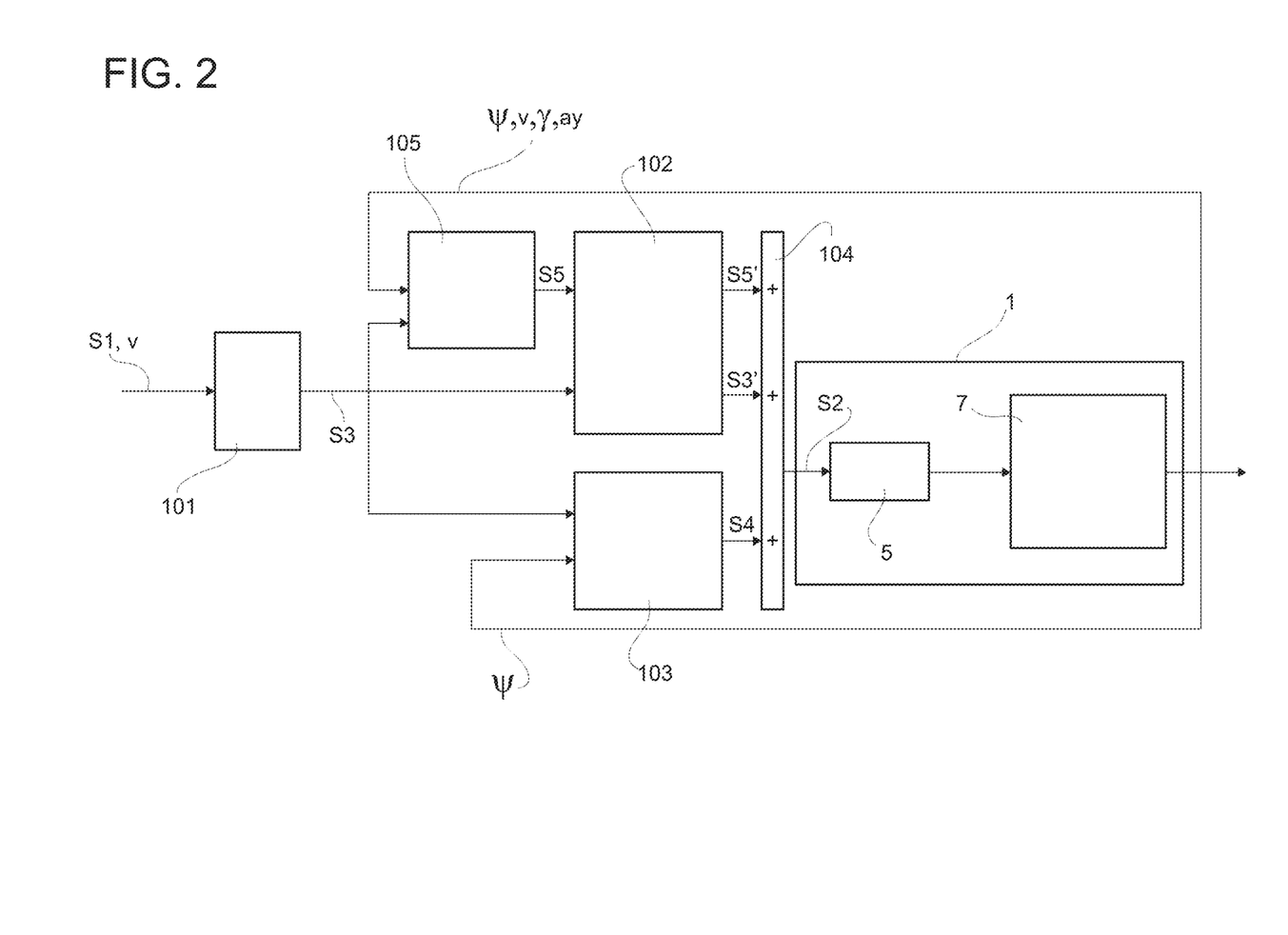
FIG. 2 is a block diagram which shows the implementation of a method according to a further embodiment of the invention.

Summarizing, with reference to FIG. 2, the control unit ECU acquires actual current values of the first and of the third variable, namely in particular of the signal S1 and of the speed v.

For example, the actual current speed v can be directly estimated by the control unit ECU, in particular based on known estimators or observers. Alternatively, the motor vehicle 1 can comprise a transducer T2 configured to detect a quantity indicative of the speed v and to generate a signal concerning the detected quantity; in this case, the control unit ECU acquires the actual current value of the first variable acquiring the signal generated by the transducer T2.

The actual current values constitute the inputs of block 101 of FIG. 2. Here, the control unit calculates an output value of the signal S3. The output value is calculated by means of the first function of the first mapping if the actual current values are included in the first region; otherwise, the output value is calculated by means of the first function of the second mapping if the actual current values are included in the second region.

The output value constitutes an input for block 102. Here, the control unit ECU calculates a desirable value for the signal S2 based on the model of the device 5, as described in the foregoing. Block 102 is entirely optional; in the case of absence of block 102, the output value would correspond to the desirable value for the signal S2.

Therefore, the control unit ECU calculates the desirable value for the signal S2 by means of the first mapping based on the actual current values if they belong to the first region. Otherwise, the control unit ECU calculates the desirable value for the signal S2 by means of the second mapping based on the actual current values if they belong to the second region.

Assuming that the desirable value is calculated by means of the first mapping and used for controlling the device 5, the same value could be used for calculating the first ratio between the yaw rate $\psi$ and the resulting steering angle. The first ratio calculated in such manner would fulfil the first target functional relationship with the actual current value of the speed v.

In this manner, the control unit ECU defines a gain between the yaw rate $\psi$ and the steering angle as a function of the speed v and at the first region of values for the signal S1.

Likewise, assuming that the desirable value is calculated by means of the second mapping and used for controlling the device 5, the same value could be used for calculating the dimensionless index of acceleration. The latter would fulfil the second target functional relationship with the actual current value of the speed v and at the second region of values for the signal S1.

Actually, the actual current value of the signal S2 may not coincide with the desirable value. Rather, the control unit ECU determines the signal S2 as a function of the calculated desirable values.

In fact, the desirable values can advantageously be corrected by adding further contributions or corrective values to the output signal S3.

In particular, a further frequency control contribution or corrective value is added to the output signal S3 only when the desirable values are determined by means of the first mapping for controlling the dynamic of the yaw rate $\psi$.

The calculation of the frequency control contribution occurs based on a third target functional relationship between the first variable and a frequency response of the yaw rate $\psi$ in response to the steering angle.

The control unit ECU provides or stores the third target functional relationship.

Figure 9:
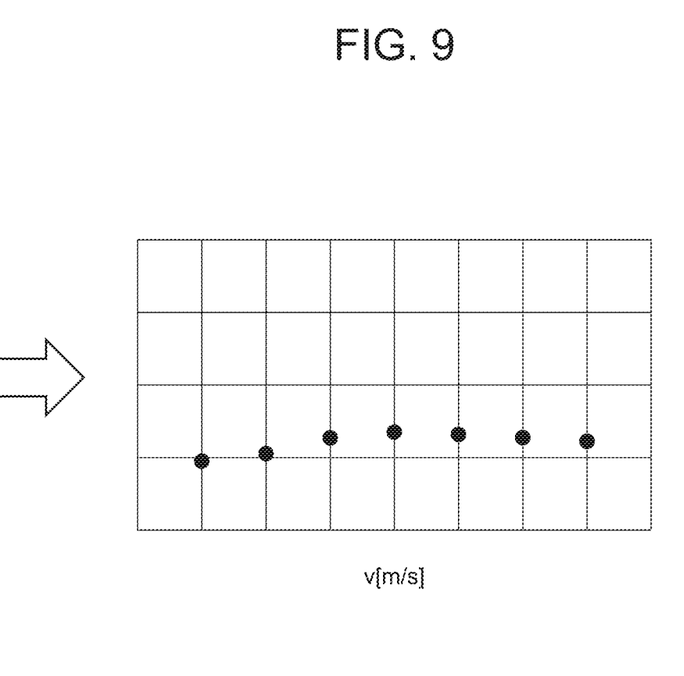

For example, the third target functional relationship is illustrated in a condensed manner in FIG. 9. FIG. 9 illustrates the relationship existing between the speed v and a dimensionless coefficient deriving from or corresponding to the module of the frequency response: in particular, the coefficient is the ratio between the module of the frequency response and a reference module associated with a specific frequency value. The third target functional relationship identifies the desired frequency response of the yaw rate $\psi$ as a function of the speed v.

Figure 8:
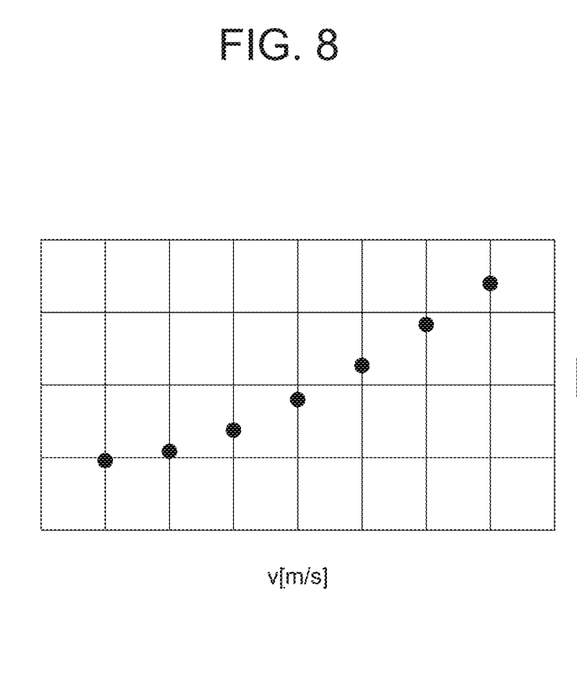
FIGS. 8 and 9 are additional function graphs which represent an additional real and target functional link, respectively, between a driving speed of the motor vehicle and the module of a frequency response of a yaw rate of the motor vehicle.

If the frequency control contribution were not calculated, the third functional relationship that would be obtained between the first variable and the frequency response would result to be, for example, as the one illustrated in a condensed manner in FIG. 8.

FIG. 8 thus illustrates in a condensed manner a third real functional relationship.

Specifically, the module of the frequency response increases in relation to the first variable. This means that the behaviour of the steering motor vehicle 1 becomes increasingly less stable when the speed v increases.

On the other hand, preferably, the third target functional relationship provides for the module of the frequency response to be substantially constant in relation to the first variable. Namely, preferably the module has a predetermined maximum deviation threshold in relation to the mean. In particular, the deviation threshold is stored by the control unit ECU. For example, a corresponding deviation threshold of the dimensionless coefficient is smaller than 0.1.

In order to control the frequency response, the control unit ECU acquires an actual current value of the yaw rate. The control unit ECU can estimate the actual current yaw rate $\psi$, for example by means of an estimator or an observer of known type. Otherwise, the motor vehicle 1 can comprise a transducer T3 configured to detect a quantity indicative of the yaw rate $\psi$ and generate a signal concerning the detected quantity; in this case, the control unit ECU acquires the actual current value of the yaw rate $\psi$ acquiring the signal generated by the transducer T3.

Furthermore, the control unit ECU defines or comprises an optimal control problem based on a linear or linearized state space model. The latter, in turn, is based on a dynamic (in particular lateral) model of the motor vehicle 1, more precisely real. Furthermore, the optimal control problem is based on the minimization of a norm H, for example the infinite norm H or the norm H2 of a cost function.

More specifically, a basic linear model on which the control problem is based can be represented by means of the following equation:

$$\dot{x} = Ax + B \begin{bmatrix} w \\ u \end{bmatrix}$$

$$\begin{bmatrix} z \\ y \end{bmatrix} = Cx + D \begin{bmatrix} w \\ u \end{bmatrix}$$

where x is the vector of the states.

Preferably, z is a vector comprising two variables, namely the frequency control contribution, to be added to the desirable value for the signal S2, and an error or difference between the third target functional relationship and the third real functional relationship. The error or difference can be calculated by the control unit ECU by means of the dynamic model, in particular real, of the motor vehicle 1. In fact, on one hand, the third target functional relationship corresponds to a target linear model of the dynamic of the motor vehicle 1, in particular lateral, provided or stored by the control unit ECU; on the other hand, the third real functional relationship corresponds to the linearized real model of the dynamic of the motor vehicle 1. Therefore, the construction of the basic model comprises a mathematical modelling of the difference between the target model and the real model.

Conveniently, y is a vector comprising the actual current value of the yaw rate $\psi$ and the output value of block 101, which for example would coincide with the desirable value for the signal S2 if block 102 were absent or inactive.

Preferably, w is the output value of block 101.

Conveniently, u is the frequency control contribution, namely the corrective value to be added to the desirable value for the signal S2.

Furthermore, A, B, C, D are matrices of the model determined for defining the variables z, y, w, u. Therefore, the matrices A, B, C, D comprise parameters concerning both the real model and the target model.

Moving on to the frequency domain, by means of the Laplace transform, the following is obtained $$\begin{bmatrix} z \\ y \end{bmatrix} = P(s) \begin{bmatrix} w \\ u \end{bmatrix}; \quad P(s) = C(sI - A)^{-1} B + D$$

Figure 10:
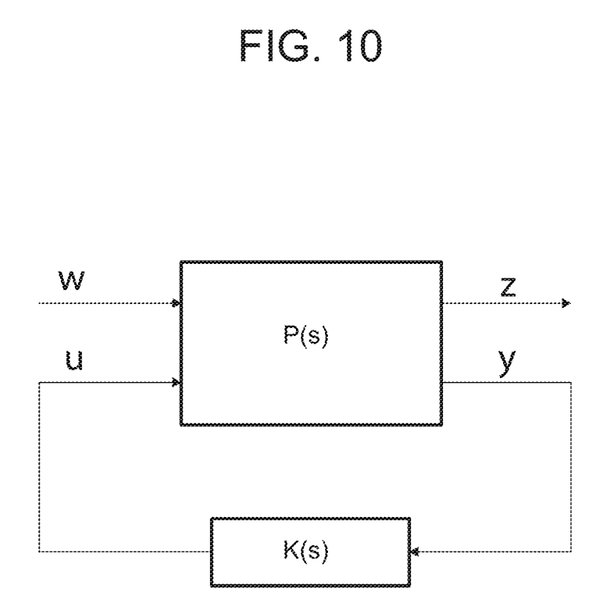
FIG. 10 is a design diagram of a controller of the apparatus.

P(s) is a transfer function from inputs of the basic model to outputs of the basic model. FIG. 10 illustrates a diagram of the basic model in the frequency domain.

The inputs comprise u as variable to be manipulated or controlled (frequency control contribution) and w as reference signal (the output value of block 101). Actually, the output value of block 101, unless block 102 is corrected, represents a reference for the control of the device 5, in order to fulfil the first or the second target functional relationship. On the other hand, the frequency control contribution has to conveniently be calibrated for fulfilling the third target functional relationship, without exceedingly conditioning the fulfilment of the first or of the second target functional relationship.

For this reason, the output of block 102, indicated by S3' in FIG. 2, is to be understood as corrective in relation to the output signal S3.

The outputs comprise z as error signals to be minimized (error in relation to the third target functional relationship and frequency control contribution) and y as acquired signals (actual current yaw rate $\psi$ and output value of block 101). Actually, both the error and the frequency control contribution have to conveniently be minimum, so that an optimal balance in the fulfilment of all the target functional relationships (the first or the second and the third) can be achieved. Furthermore, the actual current value of the yaw rate $\psi$ and the output value (block 101) are actually available and thus acquired by the control unit ECU.

Therefore, in the light of the foregoing, the control unit ECU can suitably define a controller or a controller function as $$u = K(s)y$$

where K(s) is the controller function, whereby a functional link between z and w can be expressed as $$Z = F(P, K)w$$

where F(P, K) represents the aforementioned cost function to be minimized. In fact, the cost function is defined by a first transfer function from the reference signal to the error signals, according to the basic model or according to the real model. Therefore, minimizing the cost function corresponds to minimizing the error signals and simultaneously minimizing the frequency control contribution, without exceedingly departing from the third target functional relationship.

The first transfer function is dependent on the controller function, which defines a second transfer function from the acquired signals to the manipulated variable, according to the basic model or according to the real model.

The second transfer function defines a parameter to be optimized for solving the optimal control problem.

In particular, the optimal control problem can be defined as $$\underset{K(s)}{argmin} \|F(P, K)\|_{H_\infty}$$

Optionally, the optimal control problem can comprise a plurality of constraints.

In other words, block 103 of FIG. 2, the control unit ECU solves the optimal control problem determining the controller function which minimizes the norm H of the cost function and determining the frequency control contribution based on the determined controller function and on the acquired signals.

In fact, block 103 receives in input the acquired signals, namely the actual current value of the acquired yaw rate $\psi$ and the output value of block 101.

The output of block 103 is indicated by S4 in FIG. 2.

The determination of the signal S2 optionally comprises the sum of the frequency control contribution calculated to the desirable value calculated for the signal S2 (block 104 of FIG. 2).

Furthermore, preferably, the control unit ECU provides or stores a third mapping which maps a set of kinematic quantities on an oversteering or understeering index of the motor vehicle 1.

The third mapping can be obtained experimentally or by means of completely theoretical or parametric mathematical models, possibly of the "black box" or "grey box" type. In the case of parametric models, the control unit ECU can identify the parameters of the models by means of known identification techniques, for example from experimental data.

Additionally, the control unit ECU acquires the actual current values of the set. The control unit ECU can directly estimate such values by means of known estimators or observers. Otherwise, the motor vehicle 1 can comprise a detection assembly configured to detect one or more or the totality of the quantities of the set.

In particular, the set comprises the yaw rate $\psi$, the lateral acceleration $a_y$, the speed v and the steering angle.

The control unit ECU calculates a further understeering or oversteering contribution to be added to the calculated desirable value for the signal S2. The understeering or oversteering contribution defines a further corrective value for the signal S2, in order to compensate a possible oversteering or understeering of the motor vehicle 1.

The control unit ECU calculates the understeering or oversteering contribution proportionally to the respective value of the understeering or oversteering index (block 105 of FIG. 2).

The output of block 105 is indicated by S5 in FIG. 2.

The calculated understeering or oversteering contribution is added to the desirable value for the signal S2 only if the value of the oversteering or understeering index fulfils a predetermined relationship with a respective oversteering or understeering threshold. In other words, the additional contribution intervenes only when the vehicle 1 is affected by a significant oversteering or understeering. Otherwise, the additional contribution is null.

Therefore, the determination optionally comprises summing the calculated understeering or oversteering control contribution to the calculated desirable value for the signal S2 (block 104 of FIG. 2). Clearly, if the relationship with the oversteering or understeering threshold is not fulfilled (for example the threshold is not exceeded), block 105 is inactive or the additional contribution is null.

Optionally, the understeering or oversteering control contribution can be further corrected, before being added to the desirable value for the signal S2, by applying the inverse of the aforementioned gain function corresponding to the model of the device 5 (block 102 of FIG. 2).

The output of block 102 in this case is indicated by S5' in FIG. 2.

In this manner, the control unit ECU determines the signal S2. Once the signal S2 has been determined, the control unit ECU controls the device 5 by means of the signal S2 and consequently adjusts the steering angle based on the signal S2, thereby completing a process for adjusting the steering angle of the motor vehicle 1.

The control unit ECU is part of an apparatus of the motor vehicle 1 for adjusting the steering angle thereof. The control unit ECU is programmed to implement the above-described process.

The process described above can be performed by the apparatus by means of the instructions of a computer program. The program can also be loaded on means which can be read by the computer.

Based on the foregoing, the advantages of the process and of the apparatus according to the invention are evident.

In fact, the invention allows arbitrarily determining the dynamic response of the motor vehicle 1 based on the driving speed thereof and on the steering control. Furthermore, la dynamic response can be adapted in a different manner based on the linearity or non-linearity of the response.

More in particular, the dynamic response can be made uniform in relation to the steering control. In this manner, the motor vehicle 1 offers greater stability and better sensations for the driver.

On the whole, the driving of the motor vehicle 1 results to be significantly facilitated.

Furthermore, the determination of the dynamic response can coexist with corrections of the understeering or of the oversteering, as well as with suitable corrections for compensating the non-ideal characteristics of the actuator device 5.

Finally, it is clear that modifications and variations can be made to the process and to the apparatus according to the invention which anyway do not depart from the scope of protection defined by the claims.

The invention claimed is:

1. A process to adjust the steering angle of a motor vehicle, the motor vehicle comprising a pair of steerable wheels, a steering control member which can be operated so as to emit a first steering control signal, and an actuator device which can be controlled so as to steer the wheels based on a second steering control signal, thereby determining the steering angle as well as, consequently, a plurality of kinematic quantities of the motor vehicle based on a dynamic response of the motor vehicle depending on a driving speed of the motor vehicle, wherein the process comprises the steps of:
   a. providing a first target functional relationship between a first variable corresponding to the driving speed and a second variable corresponding to a first ratio between a first quantity of said kinematic quantities and the steering angle;
   b. defining a first region of an algebraic space defined by the first variable and by a third variable corresponding to the first steering control signal;
   c. providing a first mapping, which associates each of first pairs of values of the first and third variable in the first region with a corresponding first desirable value for the second steering control signal, such that the steering angle that would consequently be determined by the actuator device fulfils the first target functional relationship;
   d. acquiring first actual current values of the first and third variable;
   e. calculating the first desirable value by means of the first mapping based on the first actual current values if defining one of the first pairs of values in the first region;
   f. determining the second steering control signal as a function of the calculated first desirable value; and
   g. controlling the actuator device with the determined second steering control signal, thereby adjusting the steering angle.

2. The process according to claim 1, wherein the first quantity is one of the yaw rate and the lateral acceleration of the motor vehicle.

3. The process according to claim 2, further comprising the steps of:
   h. providing a second target functional relationship between the first variable and a fourth variable corresponding to a second ratio between a second quantity of said kinematic quantities and the steering angle;
   i. defining a second region of said algebraic space, which is distinct from the first one;
   j. providing a second mapping, which associates each of second pairs of values of the first and third variable in the second region with a corresponding second desirable value for the second steering control signal, such that the steering angle that would consequently be determined by the actuator device fulfils the second target functional relationship;
   k. calculating the second desirable value by means of the second mapping based on the first actual current values if defining one of the second pairs of values in the second region; and
   l. determining the second steering control signal as a function of the calculated second desirable value,
      wherein the second quantity is the other one of the yaw rate and the lateral acceleration of the motor vehicle.

4. The process according to claim 3, wherein a third quantity and a third region are defined by the first quantity and by the first region or by the second quantity and by the second region, respectively, the third quantity being the lateral acceleration of the motor vehicle, wherein the third region is inferiorly delimited by a control threshold for the third variable, the control threshold being a function of the first variable, in particular decreasing as the first variable increases.

5. The process according to claim 2, wherein the first target functional relationship comprises at least a first substantially constant portion, namely having a maximum deviation in relation to the mean which is smaller, in module, than a first predetermined threshold.

6. The process according to claim 5, wherein the first quantity is the yaw rate and wherein the first target functional relationship further comprises a second portion decreasing in relation to the first variable, the first and the second portion being defined in a lower and upper interval of the first variable, respectively.

7. The process according to claim 6, further comprising the steps of:

providing a second target functional relationship between the first variable and a fourth variable corresponding to a second ratio between a second quantity of said kinematic quantities and the steering angle;

defining a second region of said algebraic space, which is distinct from the first one;

providing a second mapping, which associates each of second pairs of values of the first and third variable in the second region with a corresponding second desirable value for the second steering control signal, such that the steering angle that would consequently be determined by the actuator device fulfils the second target functional relationship;

calculating the second desirable value by means of the second mapping based on the first actual current values if defining one of the second pairs of values in the second region; and determining the second steering control signal as a function of the calculated second desirable value, wherein the second quantity is the lateral acceleration and wherein the second target functional relationship is substantially constant in relation to the first variable, namely having a derivative in relation to the first variable which is smaller, in module, than a second predetermined threshold.

8. The process according to claim 1, wherein the first mapping comprises a first function which associates each of the first pairs of values with a corresponding output value.

9. The process according to claim 8, wherein the first quantity is the yaw rate, the process further comprising the steps of:

providing a third target functional relationship between the first variable and a frequency response of the yaw rate in response to the steering angle;

acquiring a second actual current value of the yaw rate;

defining an optimal control problem based on a linear state space model concerning the dynamic of the motor vehicle and on the minimization of a norm H of a cost function, wherein:

inputs of said model comprise a manipulated variable and a reference signal comprising the output value, outputs of said model comprise error signals to be minimized and acquired signals, the cost function is defined by a first transfer function from the reference signal to the error signals according to said model, the first transfer function is dependent on a controller function, the controller function defines a second transfer function from the acquired signals to the manipulated variable according to said model, the second transfer function defines a parameter to be optimized to solve said problem, the acquired signals comprise the acquired second actual current value and the output value, the manipulated variable corresponds to a first corrective value to be added to the calculated first desirable value to determine the second steering control signal in step f, and the error signals comprise the first corrective value and a difference between the third target functional relationship and a corresponding third real functional relationship between the first variable and said frequency response according to said model, solving the optimal control problem determining the controller function that minimizes said norm H of the cost function and determining the first corrective value based on the determined controller function and on the acquired signals, wherein step f comprises algebraically summing the determined first corrective value and the calculated first desirable value.

10. The process according to claim 9, wherein the third target functional relationship is such that a module of said frequency response is substantially constant in relation to the first variable, namely is such that said module has a maximum deviation in relation to the mean which is smaller than a further predetermined threshold.

11. The process according to claim 1, further comprising the steps of:

providing a third mapping, which maps a set of said kinematic quantities onto an oversteering or understeering index indicative of an oversteering or of an understeering of the motor vehicle;

acquiring respective third actual current values of said set;

calculating a value of the oversteering or understeering index by means of the third mapping based on the third actual current values; and calculating a second corrective value proportionally to the value of the oversteering or understeering index to be added to the calculated first desirable value to determine the second steering control signal in step f, if the value of the oversteering or understeering index fulfils a predetermined relationship with a given oversteering or understeering threshold, wherein said set comprises the yaw rate, the lateral acceleration, the driving speed and the steering angle of the motor vehicle, wherein step f comprises algebraically summing the calculated second corrective value and the calculated first desirable value to compensate the oversteering or understeering of the motor vehicle.

12. The process according to claim 8, further comprising the step of:

providing a model of the actuator device adapted to estimate the steering angle determined by the actuator device applying a first gain function to the second steering control signal, wherein the first mapping further comprises a second function, which associates the output value with the first desirable value based on the model of the actuator device applying a second gain function to the output value, and wherein the second gain function is an inverse function of the first gain function.

13. The process according to claim 12, further comprising the steps of:
- providing a third mapping, which maps a set of said kinematic quantities onto an oversteering or understeering index indicative of an oversteering or of an understeering of the motor vehicle;
- acquiring respective third actual current values of said set;
- calculating a value of the oversteering or understeering index by means of the third mapping based on the third actual current values; and
- calculating a second corrective value proportionally to the value of the oversteering or understeering index to be added to the calculated first desirable value to determine the second steering control signal in step f, if the value of the oversteering or understeering index fulfils a predetermined relationship with a given oversteering or understeering threshold,
- wherein said set comprises the yaw rate, the lateral acceleration, the driving speed and the steering angle of the motor vehicle,
- wherein step f comprises algebraically summing the calculated second corrective value and the calculated first desirable value to compensate the oversteering or understeering of the motor vehicle, and
- wherein step of calculating a second corrective value comprises:
  - calculating a third corrective value proportionally to the value of the oversteering or understeering index; and
  - calculating the second corrective value applying the second gain function to the third corrective value.

14. An apparatus to adjust the steering angle of a motor vehicle, the motor vehicle comprising a pair of steerable wheels, a steering control member which can be operated so as to emit a first steering control signal, and a actuator device which can be controlled so as to steer the wheels based on a second steering control signal, thereby determining the steering angle as well as, consequently, a plurality of kinematic quantities of the motor vehicle based on a dynamic response of the motor vehicle depending on a driving speed of the motor vehicle, wherein the apparatus comprises a control unit which is programmed to implement the process according to claim 1.

15. A motor vehicle, comprising:
- a pair of steerable wheels orientable at a steering angle;
- a steering control member which can be operated so as to emit a first steering control signal;
- an actuator device which can be controlled so as to change the steering angle of the wheels based on a second steering control signal; and
- a control unit programmed to:
  - provide a target functional relationship between a first variable corresponding to the driving speed of the motor vehicle and a second variable corresponding to a ratio between a kinematic quantity of the motor vehicle and the steering angle;
  - define a region of an algebraic space defined by the first variable and by a third variable corresponding to the first steering control signal;
  - provide a mapping which associates pairs of values of the first and third variables in the region with a corresponding desirable value for the second steering control signal such that the steering angle that would consequently be determined by the actuator device fulfils the target functional relationship;
  - acquire actual current values of the first and third variables;
  - calculate the desirable value by way of the mapping based on the actual current values of the first and third variables when defining one of the pairs of values in the region;
  - determine the second steering control signal as a function of the calculated desirable value; and
  - control the actuator device with the determined second steering control signal, thereby adjusting the steering angle of the wheels.

16. The motor vehicle of claim 15, wherein the steering control member comprises a steering control member.

* * * * *